July 29, 1947. J. W. MYNSSEN 2,424,942
SELF-LOCKING EQUALIZING DRIVE
Filed Dec. 31, 1943 3 Sheets-Sheet 2
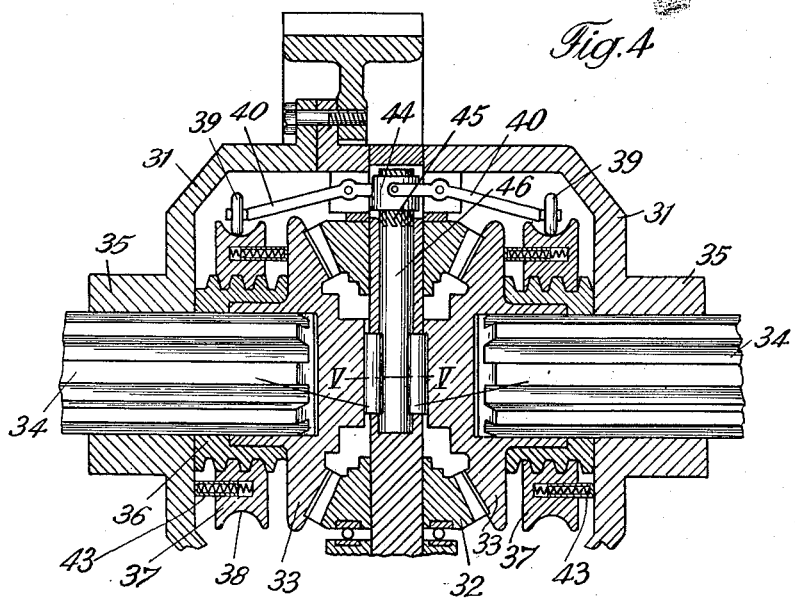
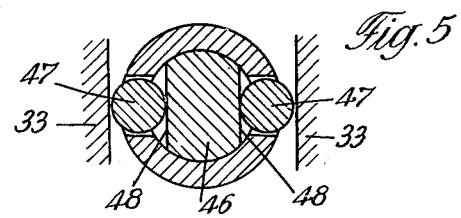
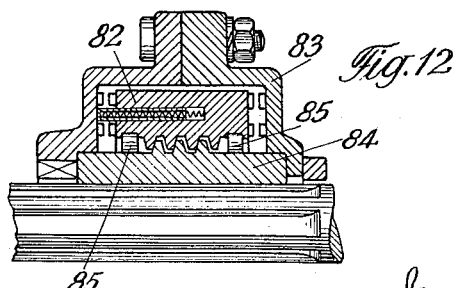
Inventor:
Jacob W. Mynssen
by Sommers & Young
Attorneys

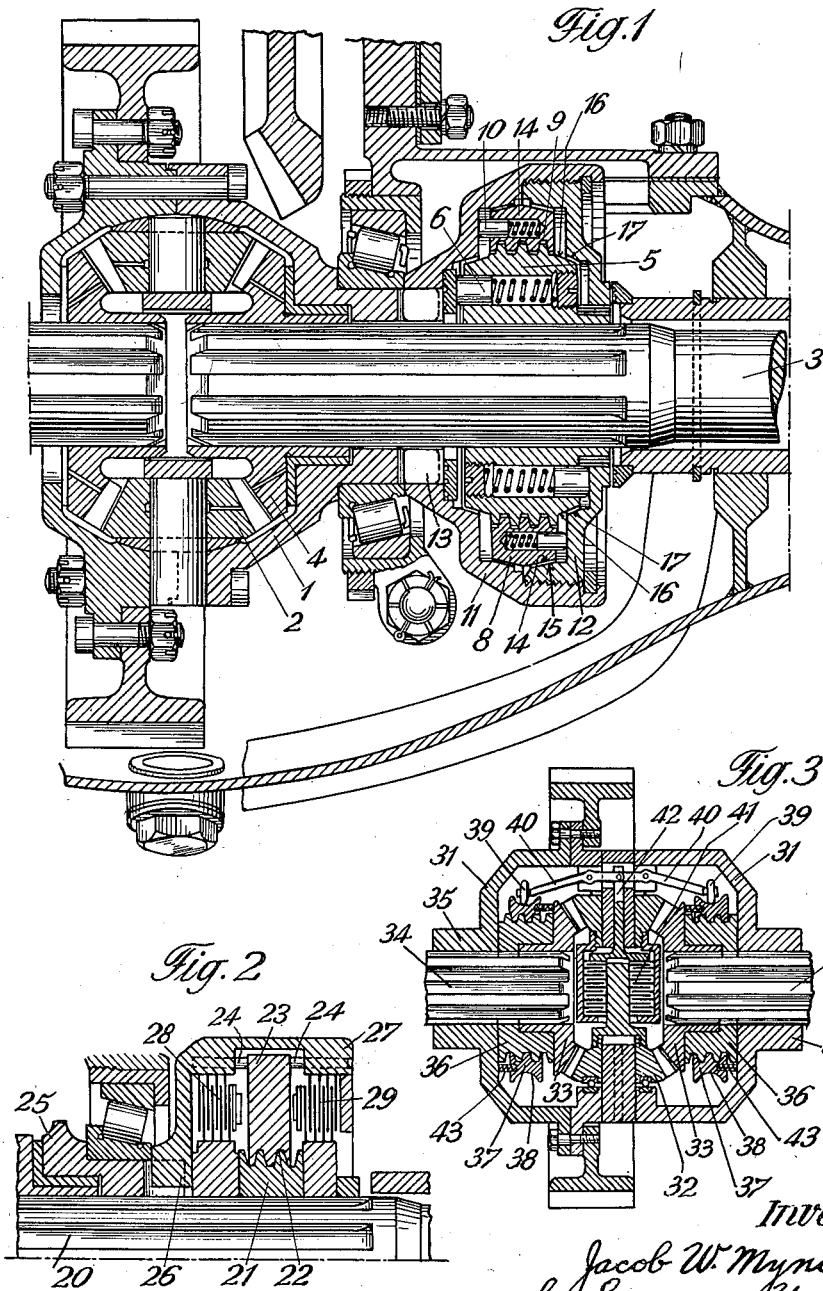

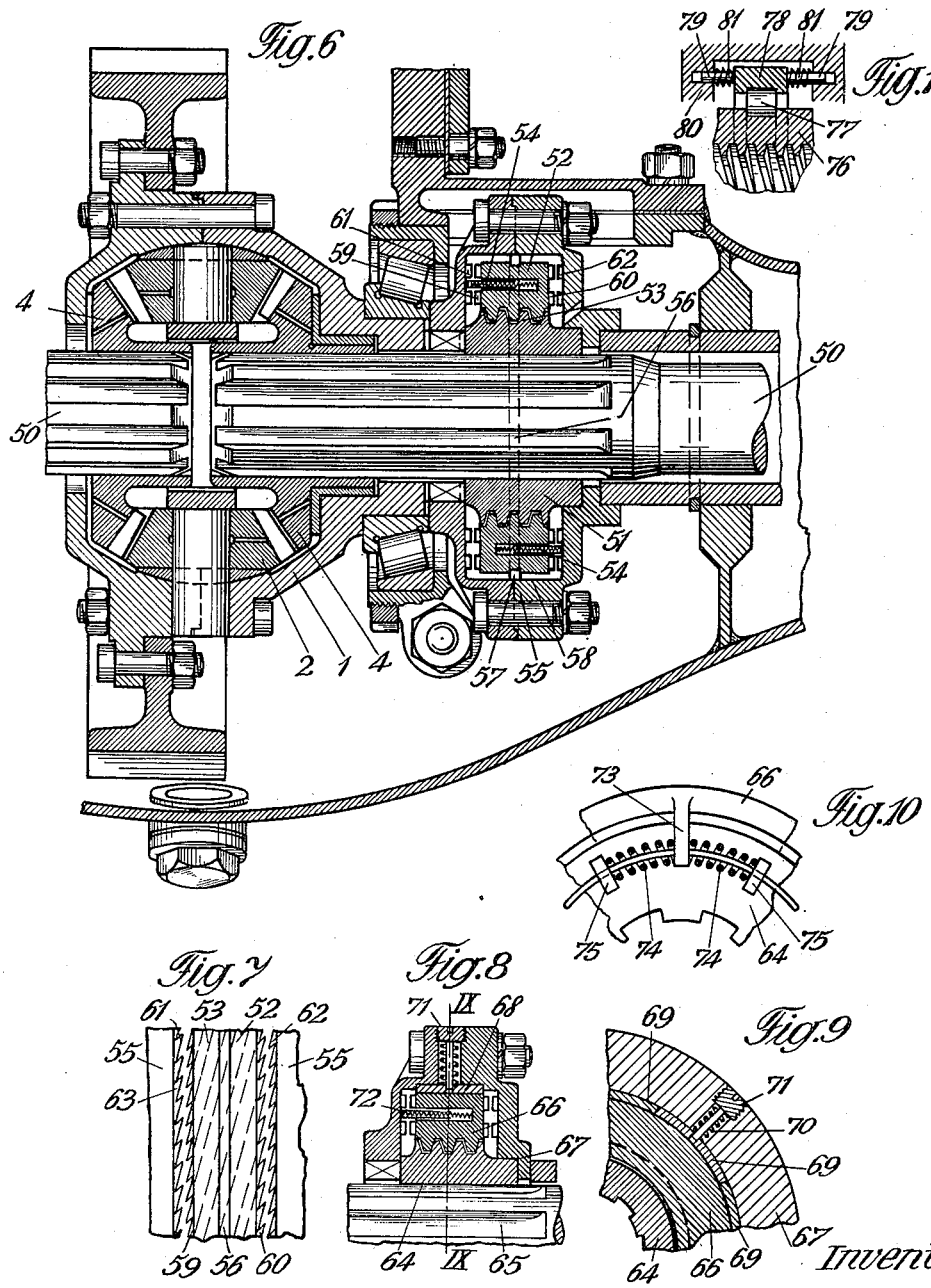

Patented July 29, 1947

2,424,942

UNITED STATES PATENT OFFICE 2,424,942

SELF-LOCKING EQUALIZING DRIVE

Jacob Willem Mynssen, Schaffhausen, Switzerland, assignor to Aktiengesellschaft der Eisen- und Stahlwerke vormals Georg Fischer, Schaffhausen, Switzerland Application December 31, 1943, Serial No. 516,455
In Switzerland November 26, 1942

8 Claims. (Cl. 74—315)

1

This invention relates to self-locking equalizing drives, particularly for motor vehicles.

Several types of equalizing drives are known in which the automatic locking is dependent upon the driving torque or the difference in speed of revolution of the side shafts with which the drive is connected. However, these equalizing drives actuate their locking means already during the normal running through curves, particularly in gradients, so that the demand on fuel and tires to be used in connection with said drives is increased compared with equalizing drives devoid of self-locking means.

A further known type of self-locking equalizing drives is based on the principle of series-connected screw drives. The last named equalizing drives actuate their locking means automatically when one of the two rear wheels skids; in running through curves and running with unequal distribution of driving torque equalization is possible in such equalizing drives without increase of torque.

The self-locking equalizing drive according to the present invention comes up to these requirements also in that on each of the two side shafts a screw thread carrier ring is secured behind which lags a connectible screw nut intermeshing with the screw thread of said ring if the speed of revolution of the associated side shaft rises abruptly and actuates the locking means by accordingly shifting in the axial direction of the ring.

In this arrangement the locking means can be constructed in a different manner. Advantageously, for this purpose friction coupling means are interposed between the screw thread carrier ring revolving together with the skidding side shaft and the brake housing being coupled to a carrier for orbital gears, the connectible screw nut and the brake drum being provided with mating conical braking surfaces. Instead of conical coupling means multiple disc clutches may be used. The locking means adapted for being actuated in the manner described may also be interposed between two oppositely disposed orbital gears.

Several embodiments of the present invention are illustrated by way of example only in the accompanying drawings in which Fig. 1 shows a longitudinal section of a first embodiment of the present invention;

Fig. 2 is a part-view of a second embodiment;

Fig. 3 shows a partial longitudinal section of a third embodiment;

2

Fig. 4 illustrates a modification of the embodiment shown in Fig. 3;

Fig. 5 shows a section on the line V—V in Fig. 4;

Fig. 6 shows a longitudinal section of a fourth embodiment;

Fig. 7 is a view of a detail of Fig. 6 as seen in plan;

Fig. 8 shows a partial longitudinal section of a fifth embodiment, inclusive of coupling means and means for the radial centering of the coupling means;

Fig. 9 shows a partial cross section on the line IX—IX in Fig. 8;

Fig. 10 is a partial face view of a specific construction of the screw thread carrier, and Fig. 11 is a partial cross sectional view of a further form of the connectible screw nut and of the parts for centering said nut radially as well as axially.

Fig. 12 illustrates a modified centering arrangement for the connectible screw nut.

Referring to Fig. 1 of the drawings, the carrier of the orbital gears 2 is designated by 1. Two side shafts 3 are coupled to bevel wheels 4. The side shafts or axles 3 are provided with superficial grooves by means of which screw thread carrier rings 5 are coupled to these shafts. In the screw thread carrier ring 5 centering bolts 6 are arranged so as to be elastically resilient alternately towards both sides. A connectable screw nut 8 is carried by the screw thread 9 of each screw thread carrier ring 5 and is also provided with elastically resilient centering bolts 10.

Each screw thread carrier ring 5 is surrounded together with its associated connectable screw nut 8 by a brake housing 11 having a cover 12 which is threadedly connected with the latter. This housing is connected with the carrier 1 of the orbital gears 2 by means of interengaging gear teeth 13. The nut 8 is provided with two conical surfaces 14 which are adapted to bear on correspondingly conical surfaces 15 in the brake housing 11 and on the cover 12. For increasing the action of the conical coupling surfaces 14 and 15 the ring 5 is likewise provided with conically turned off shoulders 16 for engagement with mating conical surfaces 17 on the brake housing 11 and on the cover 12.

The operation of the arrangement described is as follows:

On both sides of the instant equalizing drive according to the present invention the respective side shaft automatic locking means as shown in Fig. 1 are arranged. During the normal running of the vehicle the screw thread carrier ring 5 rotates together with its side shaft 3 at equal speed of revolution as the brake housing 11 which is driven by the carrier 1 of the orbital gears 2. The connectable screw nut 8 has thus imparted thereto a corresponding speed of revolution by friction action of the spring centering bolts 10 and will be positioned at all times substantially in the middle between the two coupling engagement surfaces 15 which are arranged on opposite sides of the nut 8, as regards the axial direction.

If for some reason or other the wheel being driven by the side shaft or axle 3 skids, the speed of revolution of the side shaft 3 and that of the screw thread carrier ring 5 increases abruptly. By effect of inertia of the movable masses of the connectable screw nut 8 this nut is incapacitated to follow this sudden rise of speed of revolution and decelerates accordingly, which signifies that then the nut lags behind the screw thread carrier ring by trailing longitudinally of the screw threads. Dependent upon the direction of rotation of the side shaft 3 the connectable screw nut 8 is laterally displaced to the left or right in the screw thread 9 and is forced by means of one or other of its conical braking surfaces 14 against the respective coupling engagement surface 15. By reaction effect on the screw thread carrier ring 5 the latter is shifted in the opposite direction until one of its axially oppositely disposed coupling engagement surfaces 16 enters into bearing engagement also.

At this moment direct power transmission from the carrier 1 of the orbital gears 2 to the side shafts 3 takes place by virtue of the equalizing drive being then locked. Consequently the skidding of the wheel is immediately automatically eliminated. This condition of locking of the equalizing drive, however, is automatically released again when the vehicle wheel runs on better ground again and is compelled to lead on the driving speed at one of the next accordingly diverting road curves to come. The pitch of the screw thread 9 and the conicity of the coupling engagement surfaces 15, 16 are so chosen that wedging or self-locking is prevented from arising. With small differences of speed of revolution between the brake housing 11 and the side axle 3 as regularly arising in negotiating curves the connectable screw nut 8 is continuously returned into median position by virtue of the centering bolts 10 so that the equalizing drive remains effective at all times under normal conditions of running.

In Fig. 2 a part-view of an embodiment of the invention is illustrated in which instead of conical couplings multiple disc clutches are used for effecting the condition of locking, the clutches being actuated by connectible nuts which are arranged for shifting axially relative to the screw thread carrier rings rotating together with the side shafts. The numeral 20 denotes a side shaft which projects into an equalizing drive like that shown in Fig. 1. The screw thread carrier ring 21 is connected to the side shaft for common rotation therewith and on the screw thread 22 a connectible screw nut 23 is mounted which is retained in median position by spring centering bolts 24. Connected with the carrier of the orbital gears 25 is a coupling housing 27 by means of cooperating gear teeth 26. In this housing two multiple disc clutches 28, 29 are accommodated. By skidding of the wheel connected with the side shaft 20 the connectible nut 23 is displaced sidewardly and is pressed either against the inner or outer multiple disc clutch dependent upon the direction of rotation. Also in this instance direct power transmission takes place between the carrier of the orbital gears 25 and the side shaft 20 by virtue of self-locking action of the equalizing drive.

In the embodiment shown in Fig. 3 the condition of locking is produced by mutual braking action of two opposed orbital gears upon each other, the braking being effected by one of the two axially displaceable connectible screw nuts. The carrier 31 of the orbital gears 32 is so constructed that between the gears 33 on the side shafts 34 and the bearings 35 the screw thread carrier rings 36 can be included. The screw thread carrier rings are coupled to the side shafts for common rotation with these shafts, being, by way of example, in the form of fluted shafts as shown in Fig. 3. On these screw thread carrier rings 36 connectible screw nuts 37 that are provided with mating interior screw threads are mounted. The screw nuts 37 are provided with an exterior groove 38 on which are running guide rollers 39 of control levers 40. Between the orbital gears 32 a coupling 41, for example a multiple disc clutch, is arranged which is actuated by the control levers 40.

In the normal condition of operation the coupling 41 is disconnected so that the orbital gears 32 can thus gyrate while curves are passed through. If by skidding of a wheel abrupt increasing of speed of revolution arises the side shaft 34 moves along also its associated screw thread carrier ring 36. The screw nut 37, however, is prevented from sharing in this increased speed of revolution due to inertia of its masses and is thus shifted relative to the screw thread dependent upon the direction of rotation of the side shaft either inwardly or outwardly. The groove 38 urges the guide roller 39 towards the edges thereof whereby the coupling 41 is rendered operative by means of the control lever 40 and a push rod 42. The coupling 41 prevents the orbital gears 32 from gyrating and thus locks the entire equalizing drive. The connectible screw nuts 37 are returned into initial position by spring centering bolts 43, which are laterally displaceably housed in pockets that are alternately arranged in both side surfaces of the nuts, as soon as the skidding wheel runs on better ground again.

In a modification of the precedingly described equalizing drive, as shown in Fig. 4, the coupling means are interposed between the two side shaft driving gears 33 for cooperation with the connectible screw nuts 37 by means of the levers 40 in the same manner as previously explained. These levers are pivotally connected to a control nut 44 which is connected with a rotatable bolt 46 by means of steeply ascending screw threads 45 devoid of self-locking action. By this means the adjusting movements of the levers 40 as imparted thereto by the connectible nuts 37 are transformed into rotational adjustments of the bolt 46 which to this end is mounted on bearing rollers 47 which are interposed between the gears 33 and flattened portions 48 on the bolt 46 as shown in Fig. 5. By corresponding rotational adjustment of the bolt 46 the rollers 47 are pressed against the adjacent end faces of the gears 33 and through the latter the outer end faces of the screw thread carrier rings 36 are pressed against the carrier 31, whereby the equalizing drive is locked.

In carrying out the present invention it is essential to provide for the locking of the equalizing drive to be effected independently of the driving torque. As long as the difference in speed of revolution of the two side shafts remains small, as occurring in negotiating curves or if the tires are unequally pumped up, no locking of the drive takes place. The screw threads on the thread carrier rings are given such a great pitch that self-locking is prevented from arising, while at the same time releasing of the locked drive automatically is ensured.

In a fourth embodiment of the invention the equalizing drive is so constructed that in the screw thread between the thread carrier ring and the connectible nut bearing contact takes place between the individual cooperating screw threads only on one side of the threads, in connection with which separate means are arranged for centering the connectible screw nut in the radial direction. This arrangement serves the purpose of more reliably ensuring that the connectible screw nut lags behind the movement of the screw thread carrier ring if the speed of revolution of the ring increases abruptly to a great extent.

Fig. 6 shows an arrangement of this kind in which the numeral 1 designates the carrier of the orbital gears 2. The side shafts 50 which are provided with grooves are coupled with the bevel wheels 4, the shafts 50 being connected with screw thread carrier rings 51 by means of these grooves. Connectible screw nuts 57 are mounted on the threads 53 of the screw thread carrier rings 51. In pockets of the connectible nut 52, centering bolts 54 are resiliently arranged alternately on opposite sides of the nut. Each screw thread carrier ring 51 is surrounded together with its associated connectible nut 52 by a coupling housing 55. The connectible nut 52 carries on its outer periphery a continuous groove 56 in which bearing rollers 57 are guided which bear on their opposite sides against a cylindrical bore 58 of the coupling housing 55.

By this means the connectible nut 55 is centered in the radial direction and the diameter of the connectible screw nut 52 is enlarged for a certain amount so as to provide for the screw threads of the thread carrier ring to contact with the screw threads of the connectible screw nut by virtue of the centering means mentioned above only on one side of each of the cooperating threads. By virtue of this arrangement lagging behind of the connectible screw nut is reliably ensured when the speed of revolution of the screw-thread carrier ring increases abruptly to a high value so that relative rotation between the ring and the nut takes place and the latter is shifted in the axial direction. The connectible screw nut 52 is provided on its end faces with saw-tooth like clutch teeth 59, 60. Oppositely to the clutch teeth 59, 60 are arranged on the inner end wall surfaces of the clutch housing 55 saw-tooth like clutch teeth 61, 62. The configuration of the clutch teeth is so chosen that the clutch teeth 59, 61 are accessible for mutual coupling engagement in one direction and the clutch teeth 60, 62 are accessible for mutual coupling engagement in the opposite direction of rotation. The angle of inclination of the rear face 63 of the clutch teeth is, advantageously, so chosen as to agree with the pitch angle of the screw thread 53. Instead of the clutches formed by clutch teeth as described obviously friction couplings may also serve.

In the embodiment shown in Figs. 8 and 9, the numeral 64 refers to a screw thread carrier ring being coupled to one of the side shafts of the equalizing drive. The screw thread carrier ring 64 supports the connectible nut 66 the thread of which has a diameter which is larger than the diameter of the thread of the ring a certain amount. The screw thread carrier ring 64 and the connectible screw nut 66 are surrounded by a clutch casing 67. The connectible nut 66 and the clutch casing 67 are provided with clutch teeth on their mutually confronting sides in the same manner as described in connection with the embodiment shown in Fig. 6. The connectible screw nut 66 having a cylindrical circumference is supported by a slide bearing 68 so as to be centered radially which bearing in turn is supported by the clutch casing 67 so that the screw threads on the thread carrier ring and those on the connectible nut can contact with each other only at cooperating screw thread flanks.

The slide bearing 68 can be constructed as a sleeve which is either integral or assembled from several segments. In the present instance the slide bearing 68 is assumed to be composed of segments 69. One or more of these segments can be pressed against the connectible nut 66 by means of weak compression springs 70 that are accommodated in bores arranged in the clutch casing 67 and can be stressed by means of screw nipples 71. In pockets in the connectible nut 66 centering bolts 72 are provided alternately on opposite sides of the nut.

Fig. 10 shows an arrangement in which the connectible nut 66 is coupled to the screw thread carrier ring so as to be elastically resiliently arranged on the latter in the circumferential direction. For this purpose on the connectible screw nut 66 at one point thereof at least a projection 73 is arranged against which abut one of the ends of weak compression springs 74, whereas the other ends of said springs abut against projections 75 that are arranged on the screw thread carrier ring 64. The connectible nut is moved along, while the relative positions of the projections 73 and the projections 75 on the thread carrier ring are only slightly changed. However, if the speed of revolution of the ring 64 rises abruptly to a high value the position of the projection 73 relative to the position of the projections 75 is changed to a greater extent so that the connectible nut 66 is coupled to the clutch casing 67.

In Fig. 11 the numeral 76 designates the connectible nut which is provided with a continucus groove in the outer circumferential portion thereof by which bearing rollers 77 are guided. An outer roller bearing race ring 78 which is formed with a groove serves as an abutment for the bearing rollers. The roller bearing race ring 78 is provided with pins 79 on the end faces thereof which are guided in bores of the clutch casing 80. The pins 79 are surrounded by compression springs 81 which bear with one of their ends on the respective end faces of the roller bearing race ring 78 and with their other ends on the inner adjacent end wall surfaces of the clutch housing 80.

Constructions are also feasible in which for the radial centering of the connectible nut instead of the clutch housing the screw thread carrier ring itself is used, as shown in Fig. 12 in which the connectible nut is designated by 82, the clutch housing by 83 and the thread carrier ring by 84. In this case the screw nut is supported by two roller bearings 85 which abut against the screw thread carrier ring 84.

I claim:

1. In a self-locking equalizing drive, particularly for motor vehicle, wheel-driving axles, driving gearing means provided with coupling means, two side wheel-driving axles for flexibly transmitting the drive from said gearing means separately for the individual axles, a screw thread carrier ring secured on each of said side axles, a screw nut having coupling means mating said gearing coupling means mounted on each of said rings, means for axially centering said screw nut relative to the associated screw thread carrier ring for obtaining bearing engagement solely between pairs of effectively cooperating screw thread flanks and means for locking the equalizing drive by shifting said nut axially of the associated ring into coupling engagement with said gearing means by virtue of said nut lagging behind said ring on abrupt undue rise in speed of revolution of the respective wheel-driving axle.

2. In a self-locking equalizing drive, particularly for motor vehicle, wheel driving axles, driving gearing means provided with coupling means, two side wheel-driving axles for flexibly transmitting the drive from said gearing means separately for the individual axles, a screw thread carrier ring secured on each of said side axles, a rotatable casing surrounding each of said rings, a screw nut having coupling means mating said gearing coupling means mounted on each of said rings inside of the respective casing, means for supporting said screw nut from the respective casing, means for axially centering said screw nut relative to the associated screw thread carrier ring for obtaining bearing engagement solely between pairs of effectively cooperating screw thread flanks, and means for locking the equalizing drive by shifting said nut axially of the associated ring into coupling engagement with said gearing means, by virtue of said nut lagging behind said ring on abrupt undue rise in speed of revolution of the respective axle.

3. In a self-locking equalizing drive, particularly for motor vehicle, wheel driving axles, driving gearing means provided with coupling means, two side wheel-driving axles for flexibly transmitting the drive from said gearing means separately, a screw thread carrier ring secured on each of said side axles, a rotatable casing surrounding each of said rings, a screw nut having coupling means mating said gearing coupling means mounted on each of said rings inside of the respective casing, each of said casings forming a slide bearing for the respective screw nut, means for axially centering said screw nut relative to the associated screw thread carrier ring for obtaining bearing engagement solely between pairs of effectively cooperating screw thread flanks, and means for locking the equalizing drive by shifting said nut axially of the associated ring into coupling engagement with said gearing means, by virtue of said nut lagging behind said ring on abrupt undue rise in speed of revolution of the respective axle.

4. In a self-locking equalizing drive, particularly for motor vehicle, wheel-driving axles, a rotatable casing surrounding each of said rings, a screw nut having coupling means mating said gearing coupling means mounted on each of said rings inside of the respective casing, each of said casings forming a slide bearing for the respective screw nut, spring means interposed between associated screw nuts and rings, means for axially centering said screw nut relative to the associated screw thread carrier ring for obtaining bearing engagement solely between pairs of effectively cooperating screw thread flanks, and means for locking the equalizing drive by shifting said nut axially of the associated ring into coupling engagement with said gearing means, by virtue of said nut lagging behind said ring on abrupt undue rise in speed of revolution of the respective axle.

5. In a self-locking equalizing drive, particularly for motor vehicle, wheel-driving axles, driving gearing means provided with coupling means, two side wheel-driving axles for flexibly transmitting the drive from said gearing means separately, a screw thread carrier ring secured on each of said side axles, a rotatable casing surrounding each of said rings, a screw nut having coupling means mating said gearing coupling means mounted on each of said rings inside of the respecitve casing, roller bearing means interposed between said screw nut and the respective casing, means for axially centering said screw nut relative to the associated screw thread carrier ring for obtaining bearing engagement solely between pairs of effectively cooperating screw thread flanks, and means for locking the equalizing drive by shifting said nut axially of the associated ring into coupling engagement with said gearing means, by virtue of said nut lagging behind said ring on abrupt undue rise in speed of revolution of the respective axle.

6. In a self-locking equalizing drive particularly for motor vehicle, wheel-driving axles, driving gearing means provided with coupling means, two side wheel-driving axles for flexibly transmitting the drive from said gearing means separately, a screw thread carrier ring secured on each of said side axles, a rotatable casing surrounding each of said rings, a screw nut having coupling means mating said gearing coupling means mounted on each of said rings inside of the respective casing, roller bearing means interposed between said screw nut and the respective casing, a separate annular raceway surrounding said roller bearing means, spring means supporting said raceway in both axial directions, means for axially centering said screw nut relative to the associated screw thread carrier ring for obtaining bearing engagement solely between pairs of effectively cooperating screw thread flanks, and means for locking the equalizing drive by shifting said nut axially of the associated ring into coupling engagement with said gearing means, by virtue of said nut lagging behind said ring on abrupt undue rise in speed of revolution of the respective axle.

7. In a self-locking equalizing drive particularly for motor vehicle, wheel-driving axles, driving gearing means provided with coupling means, two side wheel-driving axles for flexibly transmitting the drive from said gearing means separately, a screw thread carrier ring secured on each of said side axles, a screw nut having coupling means mating said gearing coupling means mounted on each of said rings, means for axially centering said screw nut relative to the associated screw thread carrier ring for obtaining bearing engagement solely between pairs of effectively cooperating screw thread flanks, means for supporting said screw nut from said ring apart from the threaded portions of said ring, and means for locking the equalizing drive by shifting said nut axially of the associated ring into coupling engagement with said gearing means by virtue of said nut lagging behind said ring on abrupt undue rise in speed of revolution of the respective axle.

8. In a self-locking equalizing drive, particularly for motor vehicle, wheel-driving axles, driving gearing means provided with coupling means, two side wheel-driving axles for flexibly transmitting the drive from said gearing means separately, a screw thread carrier ring secured on each of said side axles, a screw nut having coupling means mating said gearing coupling means mounted on each of said rings, means for axially centering said screw nut relative to the associated screw thread carrier ring for obtaining bearing engagement solely between pairs of effectively cooperating screw thread flanks, roller bearing means for supporting said screw nut from said ring apart from the threaded portions of said ring, and means for locking the equalizing drive by shifting said nut axially of the associated ring into coupling engagement with said gearing means, by virtue of said nut lagging behind said ring on abrupt undue rise in speed of revolution of the respective axle.

JACOB WILLEM MYNSSEN.

REFERENCES CITED

The following references are of record in the file of this patent:

UNITED STATES PATENTS

| Number | Name | Date |
|---|---|---|
| 1,979,414 | Smith | Nov. 6, 1939 |
| 849,474 | Hedgeland | Apr. 9, 1907 |
| 962,252 | Rockwell | June 21, 1910 |
| 1,254,180 | Ward | Jan. 22, 1918 |
| 1,361,895 | Nogrady | Dec. 14, 1920 |
| 1,431,535 | MacDonald | Oct. 10, 1922 |
| 1,838,380 | Fraser | Dec. 29, 1931 |
| 1,938,457 | McCaffery | Dec. 5, 1933 |
| 2,334,221 | Schmidt | Nov. 16, 1943 |
| 2,234,592 | Fitzner | Mar. 11, 1941 |
| 1,466,778 | Woods | Sept. 4, 1923 |